UNITED STATES PATENT OFFICE.

WILLIAM CAMPBELL, OF JERSEY CITY, NEW JERSEY.

IMPROVEMENT IN THE PROCESS OF ETCHING GLASS.

Specification forming part of Letters Patent No. 193,921, dated August 7, 1877; application filed February 23, 1877.

*To all whom it may concern:*

Be it known that I, WILLIAM CAMPBELL, of the city of Jersey City, county of Hudson and State of New Jersey, have invented a new, improved, and useful Method of Preparing Glass or Metals to be Etched or Cut by Acid or Sand-Blast, of which the following is a specification:

Among the difficulties which have heretofore existed, and which I have sought to remedy, and have succeeded in overcoming by my improved method, are that the gelatine film, which has been placed directly upon the glass to be etched, is not a sufficiently perfect resistant of acid. It is also easily detached, and is sometimes raised or blistered, so that the acid eats under the edge of the hardened lines, and thus renders the lines of the picture irregular and imperfect, and where the asphalt has been placed upon the glass, instead of a gelatine film, and sensitized, which is sometimes done, it requires clear sunlight and a long time for printing the design.

That others skilled in the art may understand and use my invention, I make the following specification.

I first cover the substance to be etched with a thin coating or base of asphalt or its equivalent. Over this base I spread a thin film of gelatine, sensitized, or to be sensitized in the usual way. Then, having prepared a negative, in any manner, I print the picture upon the sensitized film of gelatine. This may be done in diffused light, and in a very short time. I then wash out or remove the soft parts of gelatine film with warm water, which does not affect the asphalt base. Having done this I remove the exposed part of the asphalt base by the use of spirits of turpentine, or other solvent that will not act upon or injure the remaining hardened portions of the gelatine film.

Among the many advantages of my process are the great rapidity with which the designs can be printed, the fact that they can be printed alike in cloudy and sunny weather, or, in other words, in diffused light, while at the same time all the advantages of the asphalt as a resistant of the acid are preserved.

I do not describe the method of printing from the negative, because that is well known; nor the method of spreading the asphalt base or the superimposed gelatine film, which may be done by brushing or flowing; nor the method of sensitizing the gelatine, or of preparing the asphalt; nor the particular manner of washing out the soft parts of the gelatine, or removing the exposed parts of the aphalt, all of which are well known, and may be done in the usual or best manner.

Having thus described my invention, what I claim as new, and desire to secure by Letters Patent, is—

The hereinbefore-described method of preparing glass and other substances for etching, by applying a coating of asphalt or other resinous or waxy substance, which is removable by turpentine or an equivalent menstruum, and a coating of sensitized gelatine, and then exposing the same to light through a photographic negative, substantially as specified.

WILLIAM CAMPBELL.

Witnesses:
  S. W. BOGLEY,
  WM. M. BRUCE.